United States Patent [19]

Osaka

[11] Patent Number: 4,801,788
[45] Date of Patent: Jan. 31, 1989

[54] BAR CODE SCANNER FOR A VIDEO SIGNAL WHICH HAS A SHADING WAVEFORM

[75] Inventor: Norihisa Osaka, Mishima, Japan

[73] Assignee: Tokyo Electric Co., Ltd., Tokyo, Japan

[21] Appl. No.: 902,523

[22] Filed: Sep. 2, 1986

[30] Foreign Application Priority Data

Sep. 10, 1985 [JP] Japan ................................ 60-198639

[51] Int. Cl.[4] .............................................. G06K 7/10
[52] U.S. Cl. ................................... 235/462; 235/463; 235/470; 382/53
[58] Field of Search ............... 235/436, 462, 463, 470; 382/50, 53

[56] References Cited

U.S. PATENT DOCUMENTS

| | | | |
|---|---|---|---|
| 4,140,271 | 2/1979 | Norjiri et al. | 235/463 |
| 4,300,164 | 11/1981 | Sacks | 382/50 |
| 4,420,742 | 12/1983 | Tadauchi et al. | 382/50 |
| 4,444,486 | 5/1984 | Itoh | 382/53 |
| 4,578,568 | 3/1986 | Tsuzuki | 235/436 |

*Primary Examiner*—Philip H. Leung
*Assistant Examiner*—Jeffrey A. Gaffin
*Attorney, Agent, or Firm*—Frishauf, Holtz, Goodman & Woodward

[57] ABSTRACT

A bar code scanner has an image sensor for detecting a bar code and for generating an output signal corresponding to the detected bar code, a sample/hold circuit for sampling, holding, and smoothing an output signal from the image sensor, a slice level determination circuit for determining a slice level in accordance with an output signal from the sample/hold circuit, and a comparator for comparing the output signals from the sample/hold circuit and the slice level determination circuit and for generating a low or high output signal in accordance with a comparison result. The slice level determining circuit has a diode parallel circuit which is formed of a pair of diodes connected in parallel with each other in opposite directions and which has one end connected to the sample/hold circuit, a capacitor connected to the other end of the diode parallel circuit, a voltage transfer circuit for transferring the voltage charged in the capacitor to the comparator, and a discharging circuit for discharging the capacitor in response to the low output signal from the comparator.

20 Claims, 9 Drawing Sheets

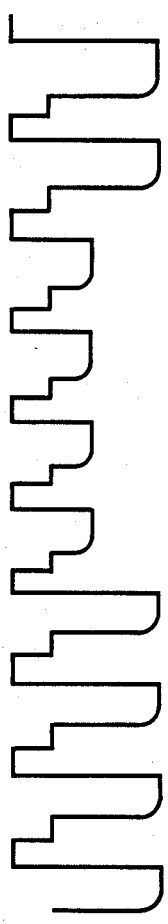
F I G. 3A
(PRIOR ART)
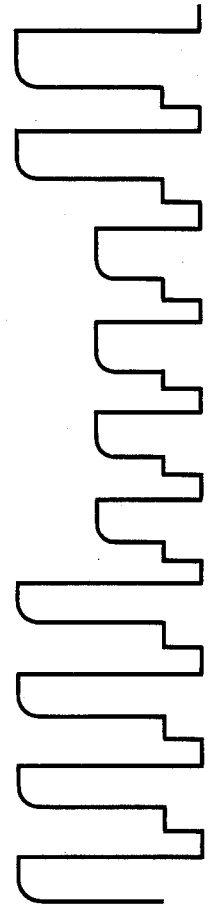
F I G. 3B
(PRIOR ART)
F I G. 3C
(PRIOR ART)
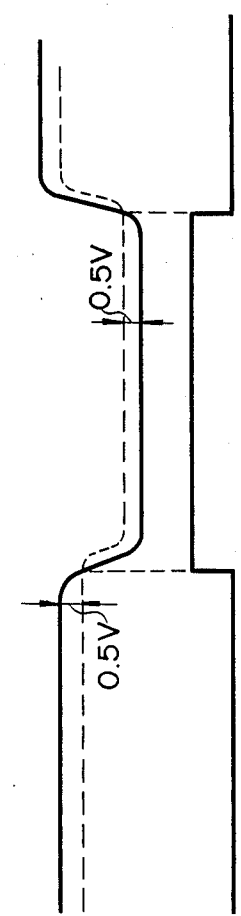
F I G. 3D
(PRIOR ART)
F I G. 3E
(PRIOR ART)

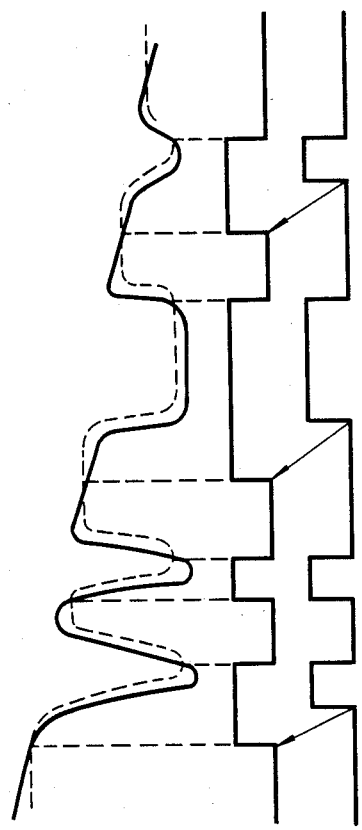
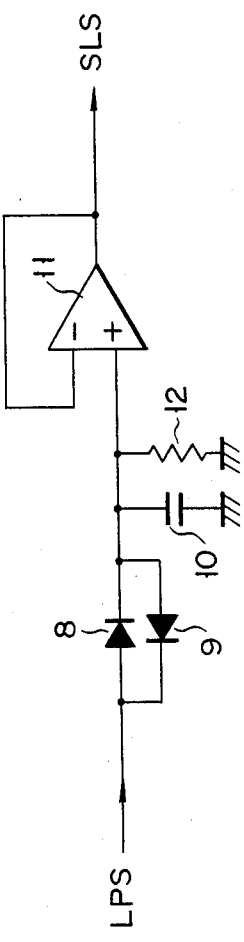
FIG. 7A (PRIOR ART)
FIG. 7B (PRIOR ART)
FIG. 7C (PRIOR ART)
FIG. 8 (PRIOR ART)

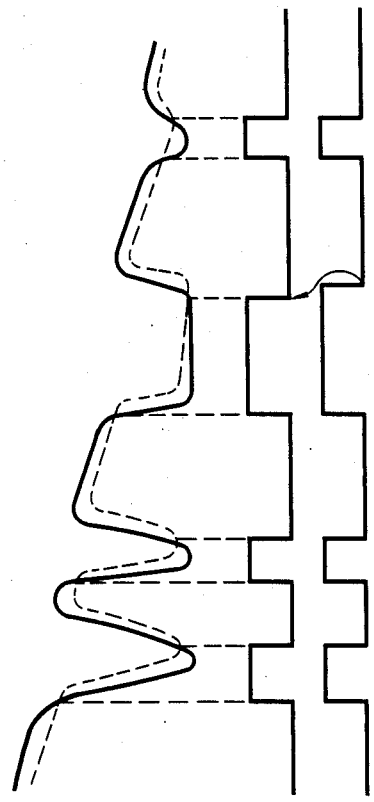
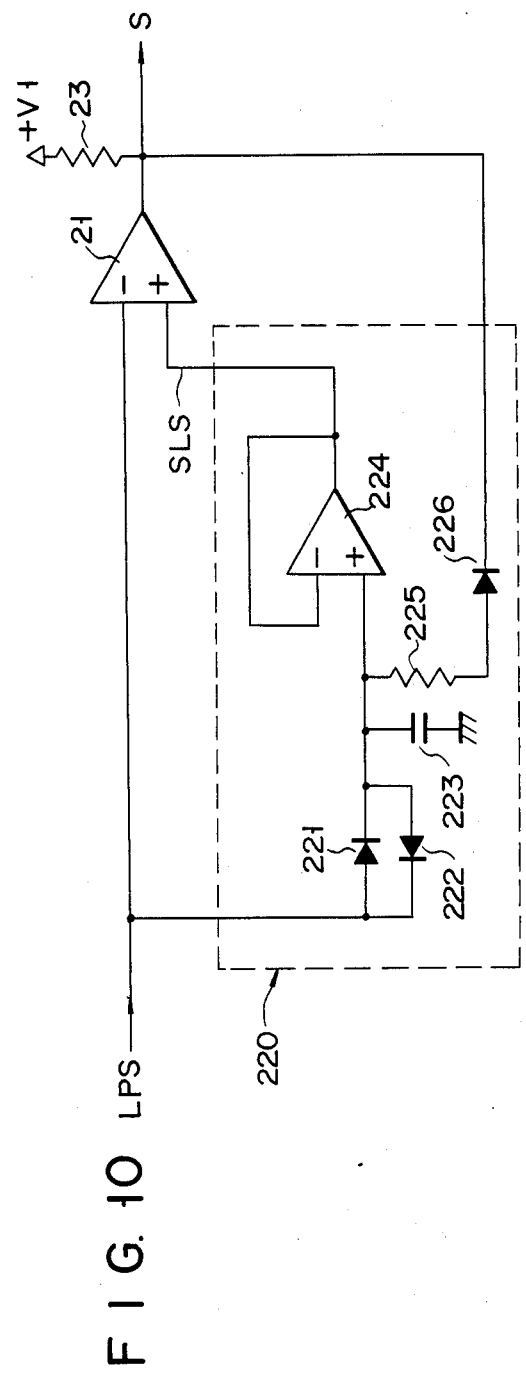
FIG. 9A (PRIOR ART)
FIG. 9B (PRIOR ART)
FIG. 9C (PRIOR ART)
FIG. 10

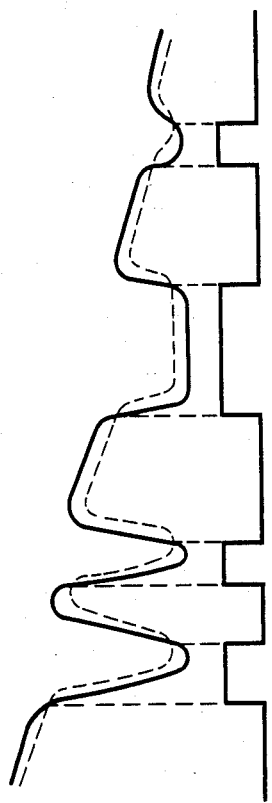
F I G. 11A
F I G. 11B
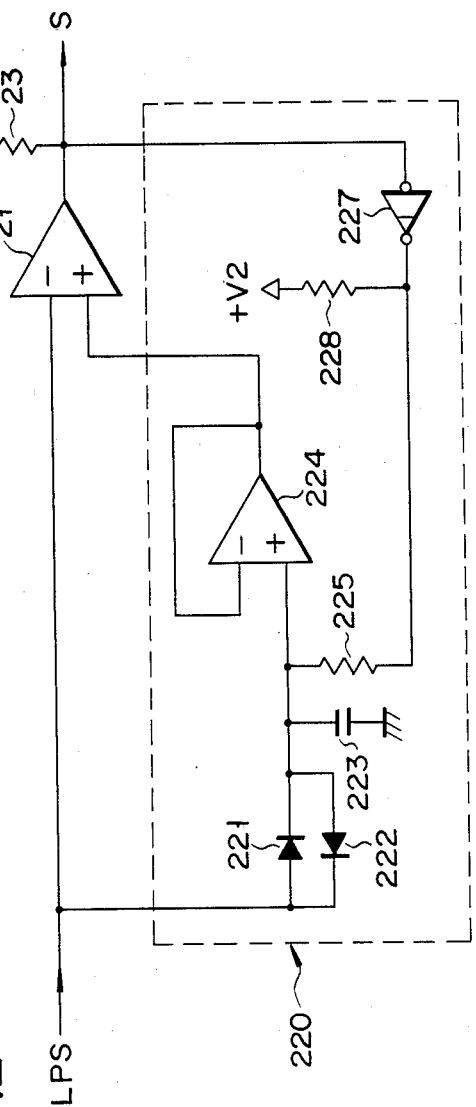
F I G. 12

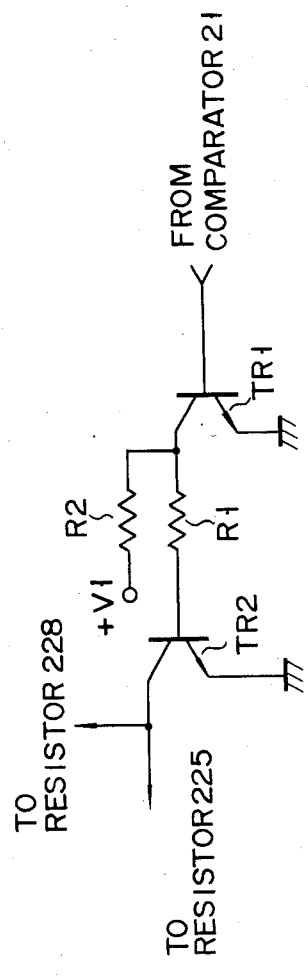
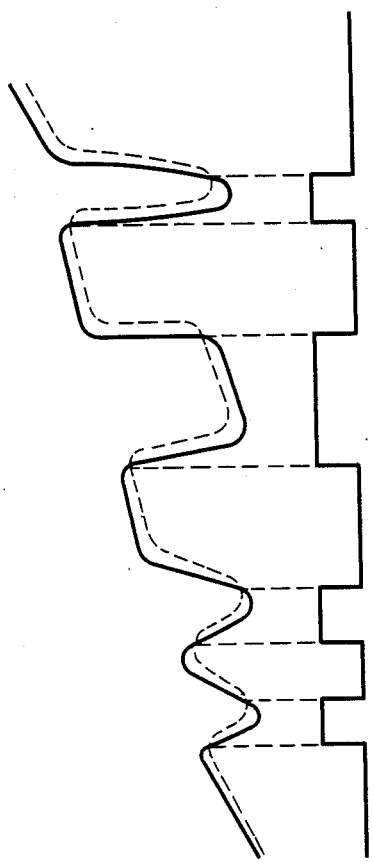
F I G. 13
F I G. 14A
F I G. 14B

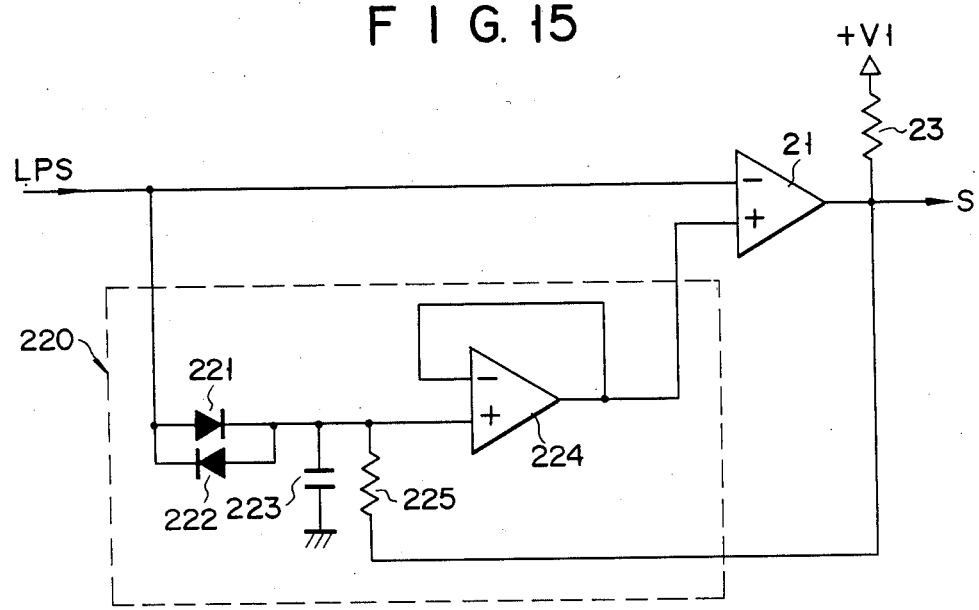
F I G. 15
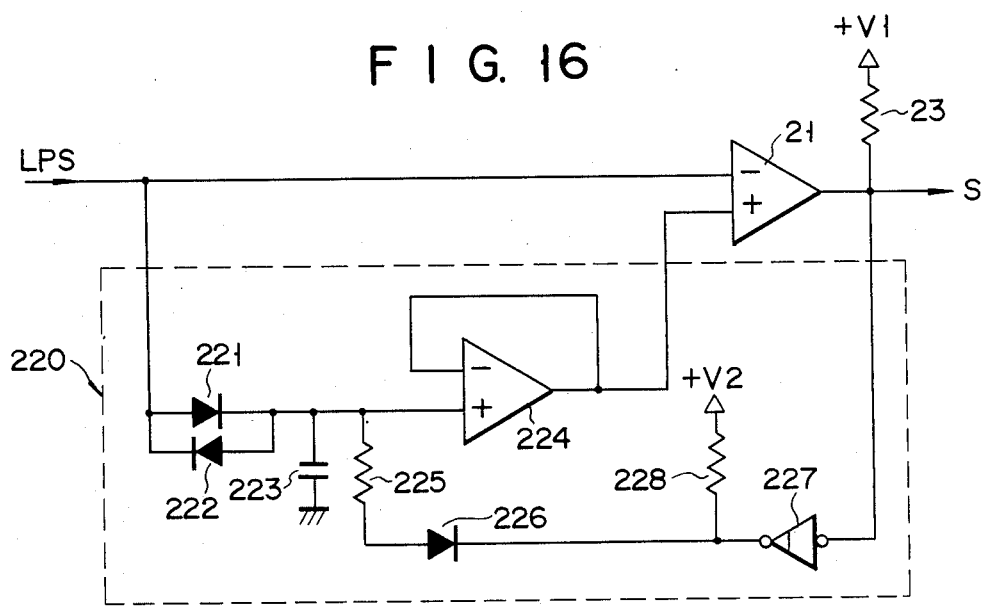
F I G. 16

F I G. 17
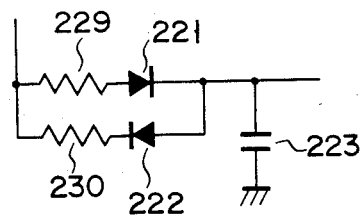
F I G. 18
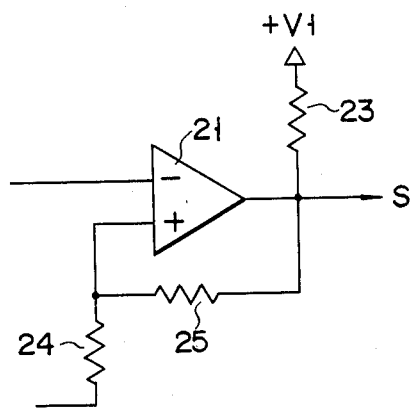
F I G. 19
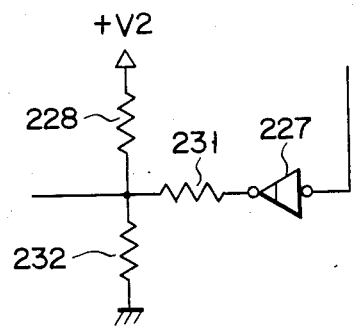
F I G. 20
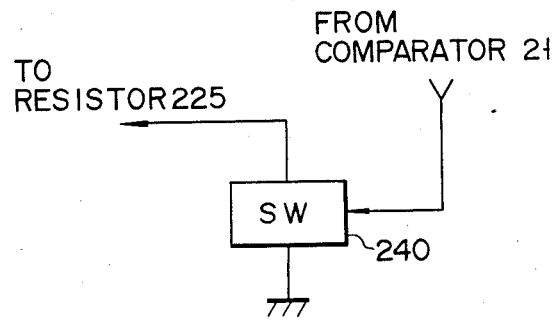

BAR CODE SCANNER FOR A VIDEO SIGNAL WHICH HAS A SHADING WAVEFORM

BACKGROUND OF THE INVENTION

The present invention relates to a bar code scanner using a line image sensor.

A conventional bar code scanner uses a line image sensor 1, such as a CCD sensor or a MOS sensor as shown in FIG. 1, to read black and white lines of a bar code with a resolution of, e.g., 2048 pixels per line. The output of image sensor 1 is amplified by preamplifier 2 and inverting amplifier 3, and is sampled and held by sample/hold circuit 4. After the high-frequency component of the output from circuit 4 is rejected by low-pass filter 5, the output is supplied to one input terminal of comparator 6 and to the other input terminal thereof through slice level determination circuit 7. Comparator 6 converts an input signal directly supplied from low-pass filter 5 into a binary signal with reference to a slice level of the output signal from circuit 7 as a reference level, and produces binary signal S corresponding to a black or white portion of the bar code.

Slice level determination circuit 7 has, e.g., an arrangement as shown in FIG. 2. More particularly, circuit 7 has diodes 8 and 9 connected in parallel with each other for receiving output LPS from low-pass filter 5 at their anode and cathode, respectively, capacitor 10 having one end connected to the cathode and anode of respective diodes 8 and 9 and the other end grounded, and amplifier 11, having a buffer structure with a unity gain, for amplifying the charged voltage of capacitor 10 and outputting the amplified voltage as slice level signal SLS.

The operation of the bar code scanner using slice level determination circuit 7 will be described with reference to the output waveforms shown in FIGS. 3A to 3E. First, a video signal shown in FIG. 3A is output from image sensor 1, and is amplified and inverted by amplifier 3 to obtain an output having a waveform as shown in FIG. 3B. This output is sampled and held by sample/hold circuit 4 to make enveloped waveform as shown in FIG. 3C. The high-frequency component of this output is rejected by low-pass filter 5 to have a smooth waveform indicated by a solid line in FIG. 3D and is input to comparator 6. The output of low-pass filter 5 is also supplied to circuit 7 and it determines the level of an output signal a level indicated by a broken line in FIG. 3D, and then supplies the output signal to comparator 6. In circuit 7, when the input voltage from low-pass filter 5 is higher than the terminal voltage of capacitor 10, it charges capacitor 10 via diode 8 to maintain its charging voltage to a level obtained by subtracting the forward voltage drop (about 0.5 V) of diode 8 from the input voltage. Capacitor 10 holds the charging level obtained when the input voltage is at its maximum level until the input voltage is decreased to a level obtained by subtracting the forward voltage drop (about 0.5 V) of diode 9 from the holding voltage of capacitor 10.

When the input voltage is decreased to a level obtained by subtracting the forward voltage drop of diode 9 from the holding voltage of capacitor 10, the charges of capacitor 10 are discharged via diode 9, and the voltage of capacitor 10 is constantly held at a level obtained by adding the forward voltage drop of diode 9 to the input voltage.

In this manner, the charging level of capacitor 10 varies between the level obtained by subtracting the forward voltage drop of diode 8 from the maximum peak voltage when the input voltage is high and the level obtained by adding the forward voltage drop of diode 9 to the minimum peak voltage when the input voltage is low. Therefore, when the input voltage is high, the slice level is lower than the input voltage level by about 0.5 V and, when the input voltage is low, the slice level is higher than the input voltage level by about 0.5 V. Comparator 6 converts the output of low-pass filter 5 into a binary signal, as shown in FIG. 3E, in accordance with input slice level signal SLS as described above. In other words, the low level of the binary signal represents a white signal and the high level thereof represents a black signal.

In order to read a bar code by a line image sensor, its image is first formed using a lens. In this case, however, because of the aperture efficiency of the lens and the cosine biquadratic laws, the intensity of the incident light at the peripheral portion of the sensor is decreased compared to that at its central portion, and the video signal from the sensor actually has a substantially semicircular waveform, as shown in FIG. 4, having its central portion as a peak. In other words, the video signal has a shading waveform. Therefore, as shown in FIG. 5A, at a signal portion in the vicinity of the central component of the video signal which corresponds to the central region of the bar code, the relationship between the output level (the waveform in the solid line) of low-pass filter 5 and the slice level (the waveform in the broken line) is maintained correct, i.e., the slice level changes in accordance with the change in output level of low-pass filter 5. Hence, as shown in FIG. 5B, the width of the black or white binary signal corresponds to the width of the black or white line of the actual bar code. Regarding the video signal envelope components which correspond to the regions on the two sides of the bar code, at a rising waveform portion, the charging level of capacitor 10 can sufficiently follow the change in input voltage. Therefore, as shown in FIG. 6A, the relationship between the output level (the waveform in the solid line) and the slice level (the waveform in the broken line) is maintained substantially correct, and the width of the black or white binary signal corresponds to the width of the black or white line of the actual bar code, as shown in FIG. 6B.

However, at a falling waveform portion, since the charging voltage of capacitor 10 has a tendency to be held at the peak level, it cannot follow the change in input voltage. As a result, as shown in FIG. 7A, the relationship between the output level (the waveform in the solid line) of low-pass filter 5 and the slice level (the waveform in the broken line) is no longer correct, and the inverting timing of binary signal S from white to black signals is advanced, as shown in FIG. 7B. As a result, the width of the white signal is decreased, and the width of the black signal is increased. Note that FIG. 7C shows a binary signal with respect to an input voltage when the above relationship is correct.

Conventional bar code scanners may, therefore, erroneously read the line width of a bar code.

In order to solve this problem, resistor 12 can be connected in parallel with capacitor 10, as shown in FIG. 8. In this case, the charges of capacitor 10 are constantly discharged via resistor 12. Therefore, as shown in FIG. 9A, even if output LPS (the waveform in the solid line) of low-pass filter 5 is gradually decreased at a falling waveform portion, the charging level of capacitor 10 can be decreased accordingly and the slice level (the waveform in the broken line) can be changed. As a result, as shown in FIG. 9B, the inverting timing of the binary signal from white to black signal can be corrected to that of the correct binary signal as shown in FIG. 9C. In this case, however, charges of capacitor 10 are discharged even if video signal LPS from low-pass filter 5 is at low level. Thus, when a black line having a large width is detected, the slice level gradually decreases even if input voltage LPS is constant. Then, the levels of charging and input voltages are inverted to advance the inverting timing of the binary signal from black to white signal, and the width of the white signal is increased. In this manner, even with the above arrangement, the line width of a bar code may be erroneously read, and a reliable countermeasure cannot thus be provided.

SUMMARY OF THE INVENTION

The object of this invention is to provide a bar code scanner which can correctly read a bar code even if a video signal from a line image sensor has a shading waveform.

The above object can be achieved by a bar code scanner including an image sensor for detecting a bar code and generating an output signal corresponding to the detected bar code, a sample/hold circuit for sampling, holding, and smoothing an output signal from the image sensor, a slice level determination circuit for determining a slice level in accordance with an output signal from the sample/hold circuit, and a comparator for comparing the output signals from the sample/hold circuit and the slice level determination circuit and generating an output signal of first or second level in accordance with a comparison result, wherein the slice level determination circuit has a diode parallel circuit which includes a pair of diodes connected in parallel with each other in opposite directions and which has one end connected to the sample/hold circuit, a capacitor connected to the other end of the diode parallel circuit, a voltage transfer circuit for transferring the voltage charged in the capacitor to the comparator, and a discharging circuit for discharging the capacitor in response to the level of the first output signal from the comparator.

According to the present invention, when the envelope value of the video signal from the sample/hold circuit is falling, the charges in the capacitor are discharged through the discharging circuit. Therefore, the slice level determination circuit can reliably determine the slice level in accordance with the video signal.

BRIEF DESCRIPTION OF THE DRAWINGS

FIGS. 3A to 3E are timing charts for explaining the operation of the bar code scanner shown in FIGS. 1 and 2;

FIGS. 7A to 7B are timing charts for explaining signal processing for a signal component corresponding to a falling portion of the bar code video signal;

FIG. 8 is a block diagram of another example of a slice level determination circuit used in the bar code scanner shows in FIG 1;

FIGS. 9A to 9C are timing charts for explaining signal processing for a signal component corresponding to a falling portion of the bar code video signal when the slice level determination circuit shown FIG. 8 is used;

FIG. 10 is a circuit diagram of a slice level determination circuit and a comparator used in a bar code scanner according to an embodiment of the present invention;

FIGS. 11A and 11B are timing charts for explaining the operation of the circuit shown in FIG. 10;

FIG. 12 is a circuit diagram of a slice level determination circuit used in a bar code scanner according to another embodiment of the present invention;

FIG. 13 is a circuit diagram of a buffer gate used in the slice level determination circuit shown in FIG. 12;

FIGS. 14A and 14B are timing charts for explaining the operation of the circuit shown in FIG. 12;

FIGS. 15 and 16 are respectively circuit diagrams, of a slice level determination circuit and a comparator used in a bar code scanner according to still another embodiment of the present invention;

FIGS. 17 and 18 show modifications of part of a slice level determination circuit and a comparator according to still another embodiment of the present invention;

FIG. 19 shows a modification of the slice level determination circuits shown in FIG. 12; and FIG. 20 shows a modification of part of the slice level determination circuit shown in FIG. 10.

DETAILED DESCRIPTION OF THE PREFERRED EMBODIMENTS

Figure 1:
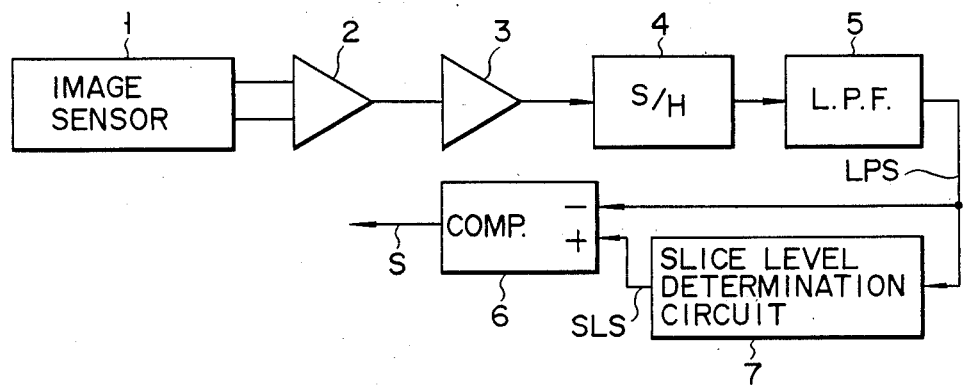
FIG. 1 is a block diagram of a conventional binary encoding circuit.
Figure 2:
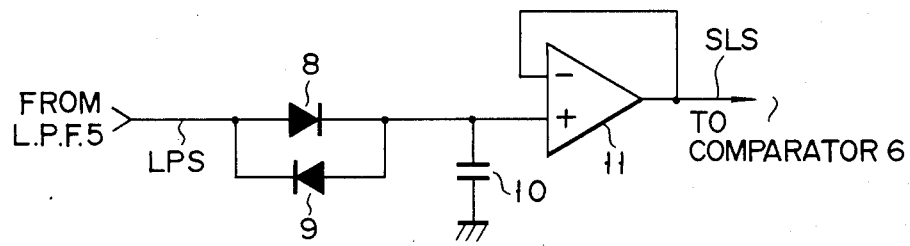
FIG. 2 is a block diagram of a slice level determination circuit used in the bar code scanner shown in FIG. 1.

The embodiments of the present invention will be described with reference to the accompanying drawings. In the embodiments, an image sensor, an amplifier, a sample/hold circuit, a low-pass filter, and so on are the same as in the conventional bar code scanner and a detailed description thereof are thus omitted. Only a slice level determination circuit and a comparator as main features of the present invention will be described.

A first embodiment of the present invention will be described. As shown in FIG. 10, output signal LPS from low-pass filter 5 is supplied to the negative signal terminal or inverting input terminal of comparator 21 and to slice level determination circuit 220. A slice level signal from circuit 220 is supplied to the positive signal terminal or non-inverting input terminal of comparator 21. In this embodiment, comparator 21 compares the level of output signal LPS from low-pass filter 5 and the level of slice level signal SLS from circuit 220 to provide binary signal S representing a low-level white signal or a high-level black signal. The output terminal of comparator 21 is connected to power source terminal +V1, e.g., 5 V via resistor 23.

Slice level determination circuit 220 has a diode parallel circuit, capacitor 223, buffer amplifier 224, and a discharging circuit. The diode parallel circuit has diodes 221 and 222 connected in parallel with each other in the opposite directions. Capacitor 223 is connected to the output terminal of low-pass filter 5 via the parallel circuit. Buffer amplifier 224 has a buffer structure, receives a terminal voltage of capacitor 223, produces slice level signal SLS at its output terminal, and has a unity gain. The discharging circuit comprises a series circuit of diode 226 and resistor 225 connected between the positive terminal of capacitor 223 and the output terminal of comparator 21. Note that diode 226 has a cathode terminal connected to the output terminal of comparator 21.

The resistance of resistor 225 is chosen such that the charging level of capacitor 223 can follow the peak voltage with a predetermined voltage difference (0.5 V) even when the slope of the falling waveform portion of video signal LPS is at maximum, and may not be immediately decreased in response to an abrupt decrease in video signal LPS when a black line is detected.

In the embodiment having the above arrangement, when the level of video signal LPS from low-pass filter 5 is higher than the charging level of capacitor 223 by the forward voltage drop of diode 221, capacitor 223 is charged through diode 221 and is constantly held at a voltage obtained by subtracting the forward voltage drop, i.e., about 0.5 V, of diode 221 from the level of signal LPS. At this time, the input voltage to the positive input terminal of comparator 21 constantly has a slice level lower than the level of output signal LPS. As a result, binary signal S generated from comparator 21 is at low level, i.e., is a white signal. In this case, since diode 226 is activated, the charges of capacitor 223 are gradually discharged via resistor 225 and diode 226. However, since capacitor 223 is also charged via diode 221, the charging voltage of capacitor 223 can be held at a level obtained by subtracting the forward voltage drop of diode 221 from video signal LPS. In this manner, when video signal LPS is a white signal, the slice level follows the level of video signal LPS with a predetermined relationship, i.e., is constantly lower than the level of video signal LPS by 0.5 V at any portion of the signal waveform, e.g., the central portion, the rising waveform portion, or the falling waveform portion of video signal LPS.

When the level of video signal LPS is abruptly decreased upon detection of a black line and the level of video signal LPS becomes below a level obtained by subtracting the forward voltage drop of diode 222 from the charging level of capacitor 223, the charging voltage of capacitor 223 is constantly held at a level obtained by adding the forward voltage drop of diode 222, i.e., 0.5 V, to the minimum peak voltage in the black level of signal LPS. In this case, the output of comparator 21 is at high level, diode 226 is thus cut off or nonactivated, and discharging of capacitor 223 through the discharging circuit is stopped. The charging level of capacitor 223 thus reliably follows the black level of video signal LPS.

Figures 4, 5A, 5B, 6A, 6B:
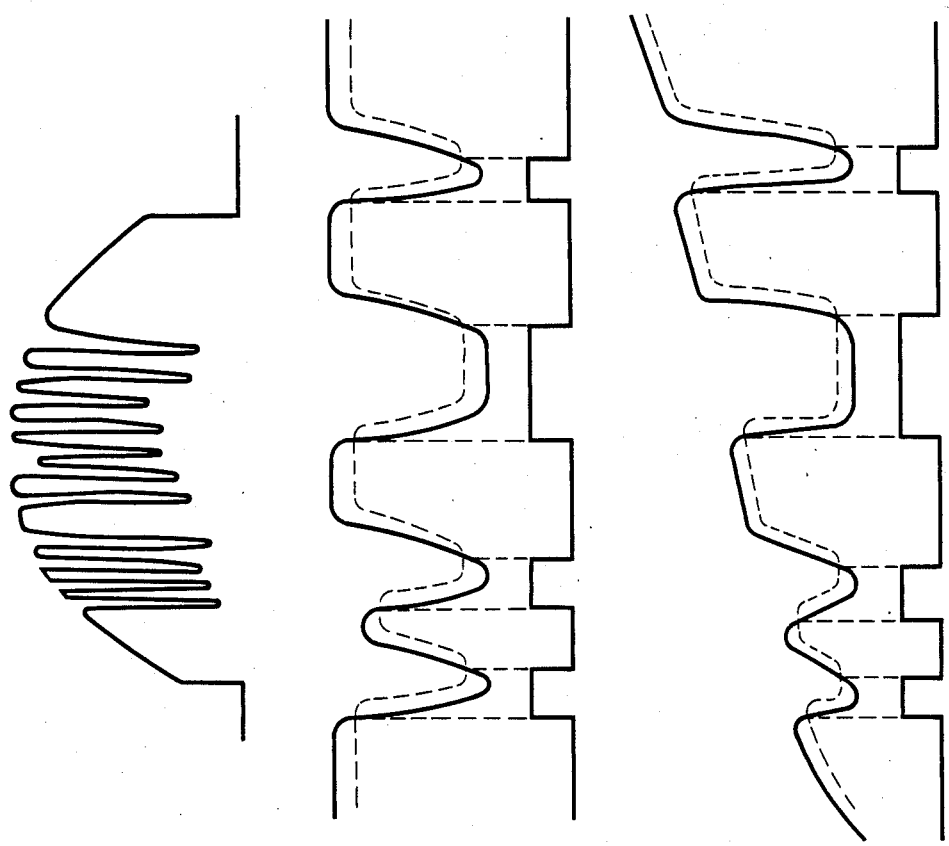
FIG. 4 shows a video signal corresponding to a bar code which is read.
FIGS. 5A and 5B are timing charts for explaining signal processing for a signal component corresponding to a central portion of a bar code video signal.
FIGS. 6A and 6B are timing charts for explaining signal processing for a signal component corresponding to a rising portion of the bar code video signal.

As a result, at the central portion of video signal LPS, the level of video signal LPS and the slice level change while maintaining a predetermined relationship with each other, like the above-described waveform shown in FIG. 5A. At the rising waveform portion of signal LPS as well, the level of video signal LPS and the slice level change while maintaining a predetermined relationship with each other, like the above-described waveform shown in FIG. 6A. Regarding the falling waveform portion of video signal LPS, the corresponding waveforms of video signal LPS and the slice level are indicated by a solid line and a broken line, respectively, in FIG. 11A. As is apparent from FIGS. 11A and 11B, the difference between the level of video signal LPS and the slice level in the vicinity of a point at which the video signal changes from a white level to a black level, and that between the level of video signal LPS and the slice level during a comparatively long black level period change in correspondence with changes in the white or black line in an actual bar code. Binary signal S generated from comparator 21 thus has a width corresponding to that of the black or white line of the actual bar code, as shown in FIG. 11B.

As described above, even when signal LPS has a shading waveform, the slice level can follow the level change therein over the entire period of the signal waveform, and binary signal S including black and white signal components whose widths correspond to the widths of the black and white lines of a bar code can be constantly generated from comparator 21. As a result, a bar code can be reliably read.

Another embodiment of the present invention will now be described.

FIG. 12 shows another embodiment of the present invention, in which diode 226 of the embodiment described above is omitted, buffer gate 227 is inserted instead, and the output terminal of buffer gate 227 is connected through resistor 228 to power source terminal $+V2$ to which a voltage, e.g., 12 V, which is higher than $+V1$ is applied.

Buffer gate 227 is an open collector type buffer gate as shown in FIG. 13, for example. More particularly, the buffer gate 227 has npn transistor TR1 having a base connected to the output terminal of comparator 21, a grounded emitter, and a collector connected to power source terminal $+V1$ via resistor R2, and npn transistor TR2 having a base connected to a the collector of transistor TR1, a grounded emitter, and a collector connected to resistors 225 and 228.

Generally, when the black-level period of video signal LPS is long, the level can gradually increase, as indicated by a waveform in a solid line in FIG. 14A. In this case, capacitor 223 is charged through resistors 228 and 225 and the slice level can follow the increase in black level. Therefore, even when the black level increases gradually, the black signal period is not decreased, nor is a next white signal period increased, and correct binary signal S as shown in FIG. 14B can be obtained. Since power source $+V2$ having a voltage level higher than power source $+V1$ is used for charging capacitor 223 via resistors 228 and 225, a wide possible rising range is allowed for the slice level when the black level is rising. In this embodiment, the same effect as the first embodiment can also be obtained.

FIG. 15 shows still another embodiment of the present invention, in which diode 226 shown in FIG. 10 is omitted. With this structure, when the black level of video signal LPS is increased, capacitor 223 is charged via resistors 23 and 225 and the slice level can follow the increase in the black level. In this case, however, a rising range allowed for the slice level is narrow compared to the case of FIG. 12.

FIG. 16 shows another embodiment of the present invention, in which diode 226 which is the same as that shown in FIG. 10 is inserted in the circuit shown in FIG. 12. In the circuit shown in FIG. 10, when the black level is increased by about $(+V1+1\ V)$, diode 226 can be activated and capacitor 223 can discharge, even in a black-level state. In contrast to this, in the embodiment shown in FIG. 16, even when the black level is increased to a level higher than $(+V1+1\ V)$, the level of the output voltage of buffer gate 227 is considerably high, and diode 226 will not be activated to allow capacitor 223 to discharge.

The present invention has been described with reference to its embodiments. However, the present invention is not limited to these specific embodiments. For example, in the embodiment shown in FIG. 12, resistor 228 and power source terminal +V2 can be removed.

In the above embodiments, the diode parallel circuit only has a pair of diodes 221 and 222 connected in parallel with each other. However, as shown in FIG. 17, resistors 229 and 230 can be connected in series with diodes 221 and 222, respectively, so that the time required for charging and discharging capacitor 223 is prolonged.

Also, as shown in FIG. 18, the output from the slice level determination circuit can be supplied to the positive input terminal or non-inverting input terminal of comparator 21 via resistor 24, and feedback resistor 25 can be connected between the output terminal and the non-inverting terminal of comparator 21. In this case, comparator 21 has hysteresis characteristics and the output level is not easily influenced by noise.

As shown in FIG. 19, the output terminal of buffer gate 227 shown in FIG. 12 can be connected to power source terminal +V2 via resistors 231 and 228, and are grounded via resistors 231 and 232. In this case, the reference charging/discharging voltage via this circuitry can be selectively set within a range between 0 and +V2.

Furthermore, diode 226 can be removed from FIG. 10, one end of resistor 225 can be grounded via switch 240 as shown in FIG. 20, and switch 240 can be controlled by an output signal from comparator 21. Then, switch 240 is turned on or off in response to a low- or high-level signal from comparator 21, respectively.

Slice level determination circuit 220 can be used not only for processing a bar code video signal, but also for processing a different signal having a shading waveform.

What is claimed is:

1. A bar code scanner for a video signal comprising:
   line image sensing means for detecting a bar code and for generating an output signal in accordance with the detected bar code;
   sample/hold means for sampling and holding an output signal from said line image sensing means, and for producing an output signal;
   comparing means for receiving said output signal from said sample/hold means at a first input terminal thereof, and for comparing the received signal from said sample/hold means with an input signal received at a second input terminal thereof, and for selectively generating a first and a second output signal in accordance with a comparison result, said first output signal being generated when said comparator determines that the output signal from said sample/hold means is in a falling waveform portion and is higher than the signal level of the signal received at said second input terminal; and
   a slice level determination circuit for determining a slice level in accordance with said output signal from said sample/hold means, said slice level determination circuit comprising:
   a diode parallel circuit which includes a pair of diodes connected in parallel with each other in opposite directions, one end of said diode parallel circuit being connected to said sample/hold means,
   capacitive means connected between another terminal of said diode parallel circuit and a reference voltage terminal,
   voltage transfer means for transferring a charging voltage of said capacitive means to said second input terminal of said comparing means, and
   discharging circuit means for gradually discharging said capacitive means in response to said first output signal from said comparing means.

2. A bar code scanner according to claim 1, wherein said sample/hold means comprises a sample/hold circuit, and a low-pass filter for smoothing an output signal from said sample/hold circuit.

3. A bar code scanner according to claim 2, wherein said discharging circuit means comprises resistive means connected between said capacitive means and an output terminal of said comparing means.

4. A bar code scanner according to claim 2, wherein said diode parallel circuit further comprises resistors connected in series with said pair of diodes, respectively.

5. A bar code scanner according to claim 2, further comprising a resistor connected between an output terminal of said comparing means and said power source terminal.

6. A bar code scanner according to claim 3, wherein said discharging circuit means further comprises diode means, connected in series with said resistive means, for preventing a high level signal generated as the second output signal from said comparing means from being transferred to said capacitive means.

7. A bar code scanner according to claim 3, wherein said discharging circuit means further comprises a buffer gate means, connected in series with said resistive means, for preventing a high level output signal generated as the second output signal from said comparing means from being transferred to said capacitive means.

8. A bar code scanner according to claim 7, wherein said buffer gate means comprises an open collector type buffer gate.

9. A bar cod scanner according to claim 8, wherein said resistive means is connected between said capacitive means and said buffer gate, and said slice level determination circuit further comprises a charging circuit means for charging said capacitive means via said resistive means.

10. A bar code scanner according to claim 9, wherein said charging circuit means comprises a resistor having one end connected to a power source terminal and another end connected to a junction between said resistive means and said buffer gate.

11. A bar code scanner according to claim 9, wherein said discharging circuit means further comprises a diode having an anode connected to said resistive means and a cathode connected to said charging circuit means and to said buffer gate.

12. A bar code scanner according to claim 3, wherein said discharging circuit means further comprises switching means, which is connected to said resistive means and to said reference voltage terminal, and which is turned on in response to the level of the first output signal from said comparing means.

13. A bar code scanner according to claim 3, wherein said voltage transfer means comprises a buffer amplifier having a high-input impedance.

14. A bar code scanner according to claim 3, wherein said comparing means comprises a comparator having first and second input terminals, a first resistor connected between an output terminal and said second input terminal of said comparator, and a second resistor connected between said second input terminal of said comparator and said voltage transfer means.

15. A bar code scanner according to claim 3, wherein said discharging circuit means further comprises an open collector type buffer gate means, connected in series with said resistive means for preventing said second output signal from said comparing means from being transferred to said capacitive means, a first resistor connected between said buffer gate means and said resistive means, and second and third resistors each having one end connected to a junction between said resistive means and said first resistor, and another end connected to a power source terminal and to said reference voltage terminal.

16. A bar code scanner according to claim 1, further comprising a resistor connected between an output terminal of said comparing means and said power source terminal.

17. A bar code scanner according to claim 1, wherein said diode parallel circuit further comprises resistors connected in series with said pair of diodes, respectively.

18. A bar code scanner according to claim 1, wherein said comparing means comprises a comparator having first and second input terminals, a first resistor connected between an output terminal and said second input terminal of said comparator, and a second resistor connected between said second input terminal of said comparator and said voltage transfer means.

19. A bar code scanner according to claim 1, wherein said discharging circuit means comprises resistive means connected between said capacitive means and an output terminal of said comparing means.

20. A signal level detecting circuit, comprising:
an input signal terminal for receiving an input signal;
comparing means, having a first input terminal connected to said input signal terminal, for comparing input signals received at said first input terminal with input signals received at a second input terminal, and for generating a first or second output signal in accordance with a comparison result, said first output signal being generated when said comparator determines that the input signal received at said first input terminal thereof is in a falling waveform portion and is higher than the signal level of the signal received at said second input terminal thereof; and
a slice level determination circuit for determining a slice level in accordance with the input signal received at said input signal terminal, said slice level determination circuit comprising:
a diode parallel circuit which includes a pair of diodes connected in parallel with each other in opposite directions, one end of said diode parallel circuit being connected to said input terminal,
capacitive means connected between another end of said diode parallel circuit and a reference voltage terminal,
voltage transfer means for transferring a charging voltage of said capacitive means to said second input terminal of said comparing means, and
discharging circuit means and gradually discharging said capacitive means in response to said first output signal from said comparing means.

* * * * *